(12) United States Patent
Nandy et al.

(10) Patent No.: US 12,706,770 B2
(45) Date of Patent: Aug. 11, 2026

(54) EFFICIENT MULTICAST SOURCE ROAMING IN AN OVERLAY NETWORK

(71) Applicant: HEWLETT PACKARD ENTERPRISE DEVELOPMENT LP, Spring, TX (US)

(72) Inventors: Tathagata Nandy, Bangalore (IN); Subramanian Muthukumar, Bangalore (IN); Chethan Chavadibagilu Radhakrishnabhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 92 days.

(21) Appl. No.: 18/790,064

(22) Filed: Jul. 31, 2024

(65) Prior Publication Data

US 2025/0373463 A1 Dec. 4, 2025

(30) Foreign Application Priority Data

May 30, 2024 (IN) ............................. 202441042082

(51) Int. Cl.
*H04L 12/18* (2006.01)
*H04L 12/46* (2006.01)
*H04L 45/64* (2022.01)

(52) U.S. Cl.
CPC ........ *H04L 12/1886* (2013.01); *H04L 12/185* (2013.01); *H04L 12/4633* (2013.01); *H04L 45/64* (2013.01)

(58) Field of Classification Search
CPC ............... H04L 12/1886; H04L 12/185; H04L 12/4633; H04L 45/64
See application file for complete search history.

(56) References Cited

U.S. PATENT DOCUMENTS 7,590,114 B1 * 9/2009 Bishara ................ H04L 49/201 370/390
2012/0207160 A1 * 8/2012 Yadav ................ H04L 12/1886 370/390
2017/0289217 A1 * 10/2017 Kebler .................... H04L 45/16

* cited by examiner

*Primary Examiner* — David R Lazaro
*Assistant Examiner* — Xiang Yu
(74) *Attorney, Agent, or Firm* — Hewlett Packard Enterprise

(57) ABSTRACT

A first network device operating as a tunnel endpoint in a tunnel fabric is provided. During operation, the first network device can receive, via a local port, a network join request to receive multicast traffic of a multicast group from a second network device. The first network device can store a multicast state for the multicast group in a data structure associated with the control plane. The multicast state can indicate that the network join request is received via a tunnel between the first and second network devices. The first network device can then determine whether a source of the multicast group is coupled to the first network device. If the source is coupled to the first network device, it can program a multicast forwarding entry corresponding to the multicast state in forwarding hardware and forward the multicast traffic to the second network device based on the multicast forwarding entry.

20 Claims, 9 Drawing Sheets

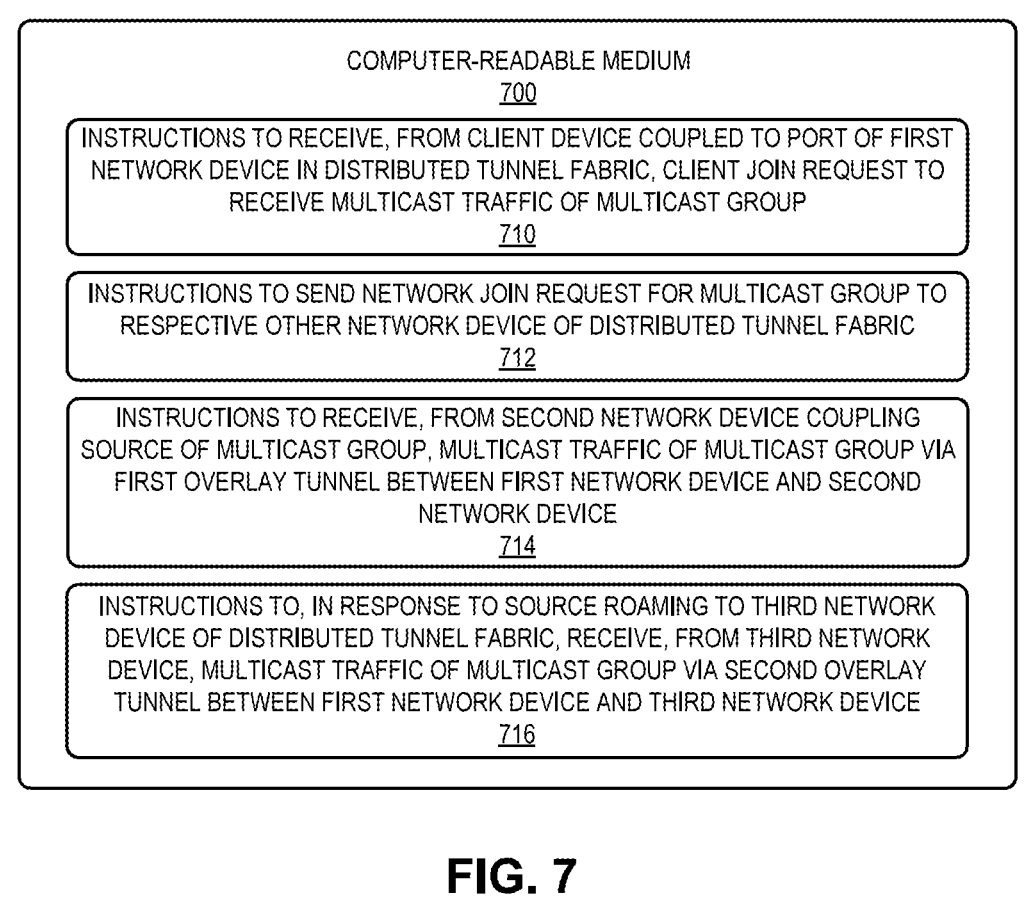

COMPUTER-READABLE MEDIUM
700

INSTRUCTIONS TO RECEIVE, FROM CLIENT DEVICE COUPLED TO PORT OF FIRST NETWORK DEVICE IN DISTRIBUTED TUNNEL FABRIC, CLIENT JOIN REQUEST TO RECEIVE MULTICAST TRAFFIC OF MULTICAST GROUP
710

INSTRUCTIONS TO SEND NETWORK JOIN REQUEST FOR MULTICAST GROUP TO RESPECTIVE OTHER NETWORK DEVICE OF DISTRIBUTED TUNNEL FABRIC
712

INSTRUCTIONS TO RECEIVE, FROM SECOND NETWORK DEVICE COUPLING SOURCE OF MULTICAST GROUP, MULTICAST TRAFFIC OF MULTICAST GROUP VIA FIRST OVERLAY TUNNEL BETWEEN FIRST NETWORK DEVICE AND SECOND NETWORK DEVICE
714

INSTRUCTIONS TO, IN RESPONSE TO SOURCE ROAMING TO THIRD NETWORK DEVICE OF DISTRIBUTED TUNNEL FABRIC, RECEIVE, FROM THIRD NETWORK DEVICE, MULTICAST TRAFFIC OF MULTICAST GROUP VIA SECOND OVERLAY TUNNEL BETWEEN FIRST NETWORK DEVICE AND THIRD NETWORK DEVICE
716

FIG. 7

EFFICIENT MULTICAST SOURCE ROAMING IN AN OVERLAY NETWORK

BACKGROUND

A network device, such as a switch, may support different protocols and services. For example, the network device can support an overlay network formed based on tunneling and virtual private networks (VPNs). The network device can then facilitate overlay routing for a VPN over the tunnels.

BRIEF DESCRIPTION OF THE FIGURES

FIG. 7 illustrates an example of a computer-readable medium (CRM) facilitating receiving multicast traffic from a roaming source, in accordance with an aspect of the present application.

In the figures, like reference numerals refer to the same figure elements.

DETAILED DESCRIPTION

Figure 1A:
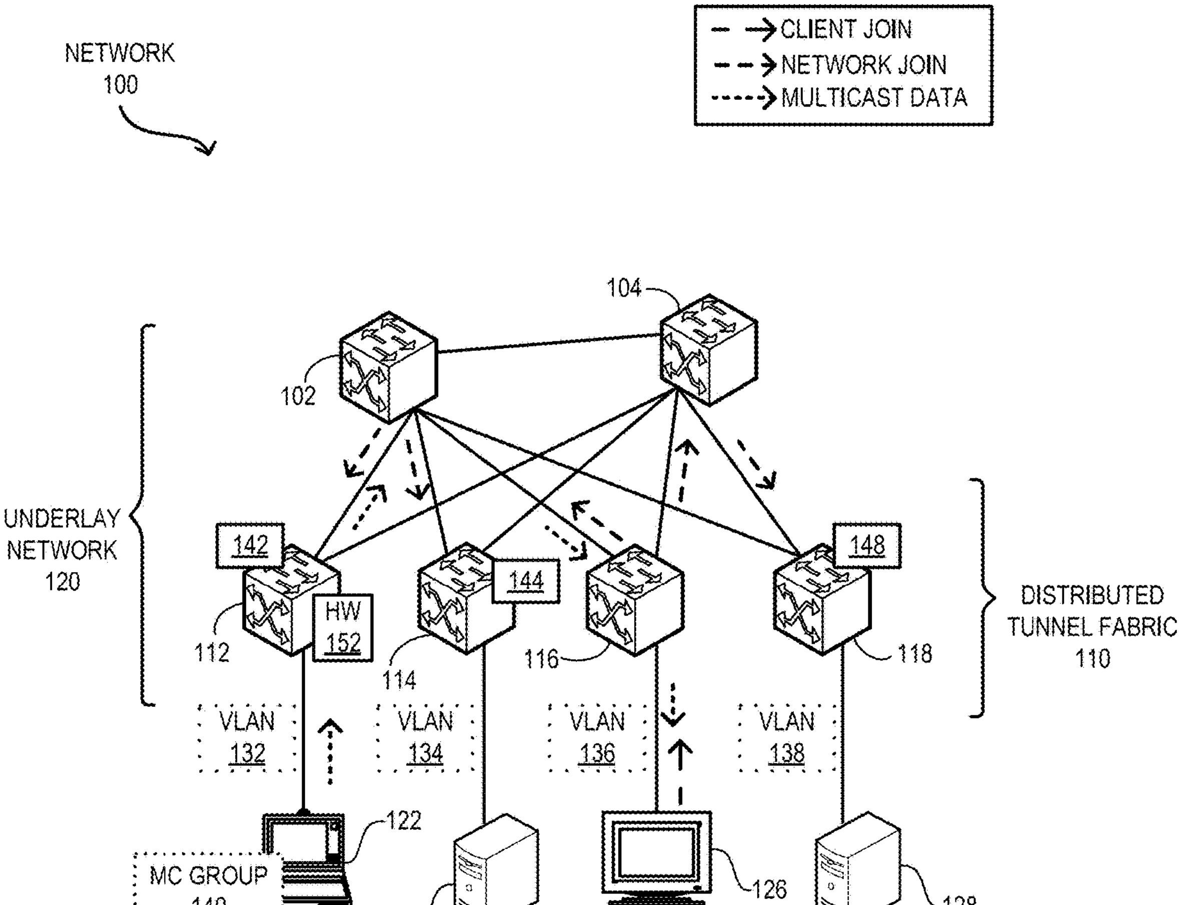
FIG. 1A illustrates an example of an overlay network supporting efficient multicast source roaming, in accordance with an aspect of the present application.

In various Internet applications, multicast is frequently used to distribute content from a source to multiple hosts via one or more network devices, such as switches. Efficient distribution of multicast traffic can improve the performance of a network. A network-layer multicast protocol, such as protocol-independent multicast (PIM), can be used for distributing content in a network. In some scenarios, a host can send a client join request (e.g., an Internet Group Management Protocol (IGMP) join request or a Multicast Listener Discovery (MLD) join request) to an upstream network device to receive traffic of a multicast group. This network device can be referred to as a requesting network device.

The requesting network device can send a network join request (e.g., a Protocol-Independent Multicast (PIM) join request) to a source network device coupling the source of the multicast group. The source network device can then start forwarding multicast traffic from the source to the requesting network device. In some examples, the network devices can be in an overlay network formed based on overlay routing for a VPN over a set of tunnels. For example, an Ethernet VPN (EVPN) can be deployed as an overlay over a set of virtual extensible local area networks (VXLANs). Here, communication between a network device pair within a fabric can be via a tunnel between the pair. For example, the multicast control and data traffic of the multicast group can be forwarded via the tunnel between the requesting network device and the source network device.

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used to forward the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. A VPN can be distributed across an overlay network. An overlay network with a VPN can also be referred to as a distributed tunnel fabric. Since the fabric is an overlay network, a respective network device in the fabric can be a tunnel endpoint of one or more tunnels.

The aspects described herein address the problem of efficiently distributing multicast traffic from a roaming source in an overlay network by (i) forwarding the network join request via a respective tunnel coupled to the requesting network device; (ii) upon receiving the network join request, maintaining a corresponding multicast state of the multicast group in the control plane; and (iii) programming a multicast forwarding entry in the hardware of the source network device based on the multicast state. As a result, though a respective network device of the overlay network can be aware that the network join request is sent from the requesting network device, only the source network device's hardware can forward the multicast traffic toward the requesting network device via the corresponding tunnel. If the source roams to a new network device, the new network device can program the forwarding hardware based on the multicast state and readily start forwarding multicast traffic to the requesting network device.

An overlay network, such as a distributed tunnel fabric (i.e., an overlay network with a VPN), can be formed when multiple network devices are coupled to each other via corresponding tunnels. In other words, a respective pair of network devices in the overlay network can be coupled to each other via a tunnel. Therefore, a respective network device in the overlay network can be a tunnel endpoint. In the underlying (or underlay) network of the overlay network, a respective network device can establish a route to every other network device. The network device can use a routing protocol, such as the Border Gateway Protocol (BGP), to establish the route. When a packet is forwarded via a tunnel, the packet is encapsulated with a tunnel header and forwarded via the corresponding route in the underlay network.

Typically, in a large overlay network, the source and hosts of a multicast group can be coupled to the overlay network. When a host sends a client join request (e.g., an IGMP join request) to receive multicast traffic of the multicast group, the requesting network device in the overlay network can receive the client join request. The requesting network device can then send a network join request (e.g., a PIM join request) to the source network device of the overlay network. The source network device can then start sending traffic to the requesting network device via the tunnel between them. In this way, the source network device can be responsible for distributing multicast traffic from the source to the requesting network devices in the overlay network. Accordingly, the source network device can replicate the multicast traffic from the source and distribute it via individual tunnels to the individual requesting network devices. Therefore, the multicast traffic can be distributed over corresponding tunnels in the overlay network.

The source may roam to a new network device (i.e., become coupled to the new network device). For example, the source can be a virtualized server, such as a virtual machine (VM), and may migrate to a new server coupled to the new network device. The new network device can then become the new source network device. When the new network device detects the source based on the media access control (MAC) address learning, it can send a control packet comprising the MAC address of the source to a respective other network device in the overlay network. For example, if the overlay network is an EVPN fabric, the new network device can send an EVPN type-3 route update packet to the other network devices of the fabric.

Upon receiving the control packet, a respective requesting network device can detect the source roaming. Due to the source roaming, the transmission of multicast traffic needs to transition to the new network device. However, the transitioning process may incur some delay because the requesting network device needs to detect the source roaming and send another network join request to the new source network device to start receiving the multicast traffic. During this period, the source may continue to send traffic, which may not be received by the requesting network devices. Therefore, some multicast traffic can be lost during the transition process.

To address the issue, upon receiving the client join request (e.g., an IGMP or MLD request) for a multicast group, the requesting network device can send a corresponding network join request (e.g., a PIM request) to a respective other network device in the overlay network via a corresponding tunnel. In this way, the other network devices of the overlay network can receive the network join request and maintain a corresponding multicast state in a data structure associated with the control plane (i.e., in respective memories of the network devices). The multicast state can include the multicast group and the tunnel on which the network join request has been received. The multicast state can also indicate the source of the multicast group. Therefore, the multicast state can indicate that the requesting network device has requested traffic associated with the multicast group.

Though the multicast state can be maintained in the other network devices, only the source network device can program its forwarding hardware to forward the multicast traffic from the source based on the multicast state. The source network device can receive multicast traffic of the multicast group via a port that couples the source. The source network device can determine that the source is coupled via a local port if the source network device has learned the MAC address of the source from the local port. The source network device can program a forwarding entry into a forwarding data structure (e.g., a multicast forwarding table) in the forwarding hardware for forwarding the multicast traffic. Since the multicast state at the source network device can indicate the tunnel between the source and requesting network devices, the entry can indicate that the traffic received through the port is to be forwarded to the tunnel. Therefore, the source network device's hardware can forward the multicast traffic toward the requesting network device via the corresponding tunnel.

If the source roams to another network device, this network device can become the new source network device. For example, if the source is a wireless device, the source can roam to a new access point (AP) coupling the new network device. Similarly, if the source is a VM, the source can migrate to a new host device (e.g., a new server) coupling the new network device. When the new source network device detects the source via a port, the new source network device can program a forwarding entry in its forwarding hardware based on the multicast state without waiting for a network join request to arrive. This forwarding entry can indicate that the traffic received through the port is to be forwarded to the tunnel between the new source network device and the requesting network device. As a result, the new source network device can readily start forwarding traffic to the requesting network device via the tunnel.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of an overlay network supporting efficient multicast source roaming, in accordance with an aspect of the present application. A network 100 can include a number of network devices (e.g., switches), and may include network components, such as layer-2 and layer-3 hops, and tunnels. In some examples, network 100 can be an Ethernet network, InfiniBand network, or other network, and may use a corresponding communication protocol, such as Internet Protocol (IP), FibreChannel over Ethernet (FCOE), or other protocol. Network 100 can include a number of network devices 102, 104, 112, 114, 116, and 118. A respective network device in network 100 can be associated with a MAC address and an IP address and can include at least one processing resource. Examples of a processing resource can include, but are not limited to, a processor core, a graphics processing unit (GPU), and a tensor processing unit (TPU).

Network devices 112, 114, 116, and 118 can operate as tunnel endpoints in an overlay network 110, such as a distributed tunnel fabric 110, where the network devices can be coupled to each other via tunnels. Therefore, network devices 112, 114, 116, and 118 can be in fabric 110. For these network devices, tunnel encapsulation is initiated and terminated within fabric 110. Network devices in fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A VPN, such as an EVPN, can be deployed over fabric 110. The tunnels in fabric 110 can be formed over an underlay network 120. Underlay network 120 can be a physical network, and a respective link of the underlying network can be a physical link.

A respective network device in fabric 110 can also be in underlay network 120. Furthermore, a network device operating as a tunnel endpoint can be in fabric 110. A respective pair of network devices in underlay network 120 can be BGP peers. Therefore, in underlay network 120, a respective network device can use BGP to establish routes via which packets are forwarded. Accordingly, the encapsulated packets of fabric 110 can be forwarded via these routes in underlay network 120. In some examples, network 100 can be a spine and leaf network wherein network devices 112, 114, 116, and 118 can be leaf devices, and network devices 102 and 104 can be spine devices. Here, leaf devices 112, 114, 116, and 118 can be in fabric 110 as tunnel endpoints. These leaf devices can also be in underlay network 120, where they participate in the BGP routing of underlay network 120.

In addition, spine devices 102 and 104 can be in underlay network 120 via which the tunnels of fabric 110 are established. Here, spine devices 102 and 104 can forward encapsulated packets of fabric 110 via underlay network 120 based on the corresponding tunnel headers. Under such a network topology, spine devices 102 and 104 can operate as aggregation devices that can aggregate traffic from leaf devices 112, 114, 116, and 118. End devices (or user devices) 122, 124, 126, and 128 can be coupled to network devices 112, 114, 116, and 118, respectively.

Here, end device 122 can be a source of a multicast group 140. Here, the multicast traffic of multicast group 140 can be transmitted from end device 122 via network device 112. Therefore, end device 122 can also be referred to as source 122, and network device 112 can be the source network device. During operation, end device 126 can send a client join request (e.g., an IGMP or MLD join request) to network device 116. In fabric 110, when network device 112 learns the MAC address of source 122, network device 112 may share the learned MAC address with other network devices. Accordingly, network device 116 can be aware that source 122 is reachable via network device 112. Network device 116 can then send a network join request (e.g., a PIM join request) to network device 112. Hence, end device 126 can also be referred to as host 126, and network device 116 can be the requesting network device.

In this example, VLANs 132, 134, 136, and 138 can be configured on network devices 112, 114, 116, and 118, respectively. Therefore, end devices 122, 124, 126, and 128 can be coupled to corresponding network devices on VLANs 132, 134, 136, and 138, respectively. Source 122 can thus send multicast traffic on VLAN 132 to network device 112. Network device 112 can then start sending traffic to network device 116 via the tunnel between them. In this way, network device 112 can replicate the multicast traffic from source 122 and distribute it via individual tunnels to the individual requesting network devices. Since VLAN 132 is not extended to another network device, the multicast traffic can be forwarded via a layer-3 tunnel (e.g., using a layer-3 TNI) to network device 116, which can then forward the multicast traffic to host 116 on VLAN 136.

If source 122 roams to a new network device 114 (e.g., due to wireless roaming or VM migration), network device 114 can detect source 122 based on MAC address learning and share the learned MAC address with other network devices. For example, in fabric 110, network device 114 can send an EVPN type-3 route update packet comprising the learned MAC address to the other network devices. In this way, network device 116 can detect the source roaming and send another network join request to network device 114. However, some delay can be incurred during the detection of the source roaming and forwarding of the new network join request. During this period, source 122 may continue to send traffic, which may not be received by network device 116. Therefore, some multicast traffic can be lost during the transition process.

To address the issue, upon receiving a client join request for multicast group 140 from host 126, network device 116 can send a corresponding network join request to network devices 112, 114, and 118 via corresponding tunnels. In other words, network device 116 can flood fabric 110 with the network join request. Network devices 112, 114, and 118 can receive the network join request and maintain a corresponding multicast state in data structures 142, 144, and 148, respectively. These data structures can be maintained by the control plane (i.e., in respective memories of network devices 112, 114, and 118). In some examples, data structures 142, 144, and 148 can be maintained and populated by respective multicast daemons (e.g., PIM daemons) of network devices 112, 114, and 118, respectively. The multicast state can include multicast group 140 and the tunnel on which the network join request has been received. The multicast state can also indicate a network address (e.g., an IP address and/or a MAC address) of source 122. For example, when network device 112 receives the network join request, the entry in data structure 142 can indicate multicast group 140 and the tunnel between network devices 112 and 116. Therefore, the multicast state can indicate that network device 116 has requested traffic associated with multicast group 140.

Network device 112 can also determine that source 122 is coupled via a local port of network device 112. Network device 112 can determine that source 122 is coupled via a local port if network device 112 has learned the MAC address of source 122 from the local port. Hence, network device 112 can determine that the condition for programming forwarding hardware 152 of network device 112 (e.g., the ASIC of network device 112) is satisfied. Accordingly, network device 112 can program forwarding hardware 152 with a forwarding entry based on the multicast state in data structure 142. The forwarding entry can be a multicast forwarding entry for multicast group 140. The forwarding entry can be a ternary content-addressable memory (TCAM) entry in forwarding hardware 152. The forwarding entry can indicate that the multicast traffic received via the port coupling source 122 should be forwarded to the tunnel between network devices 112 and 116.

On the other hand, network devices 114 and 118 can determine that the condition for programming the forwarding hardware is not satisfied. Therefore, though network devices 114 and 118 have received network join requests, network devices 114 and 118 can refrain from programming their respective forwarding hardware. Here, refraining from programming the forwarding hardware after receiving a network join request can be an atypical and active operation of a network device because the network device typically can program a forwarding entry in the forwarding hardware upon receiving a network join request. For example, the respective multicast demon instances of network devices 112, 114, and 116 can perform an additional check on the condition for programming the forwarding hardware. Because the condition is not satisfied at network devices 114 and 116, the multicast daemon instances on these network devices can refrain from programming their respective forwarding hardware. Network device 112 can receive the multicast traffic of multicast group 140 from source 122. Network device 112 can then forward the multicast traffic via the tunnel to network device 116. Network device 112 can encapsulate a respective multicast data packet of multicast group 140 with a tunnel encapsulation header (e.g., a VXLAN header) and forward the encapsulated packet to network device 116. The source and destination addresses of the encapsulation header can correspond to network devices 112 and 116, respectively. Network device 116 can decapsulate the tunnel header and forward the multicast packet to host 126.

The multicast states in data structures 144 and 148 can allow network devices 114 and 118 to readily program the forwarding hardware. As a result, if source 122 roams to another network device 114, network device 114 can readily program its forwarding hardware based on the entry in data structure 144 without waiting for a network join request from network device 116. In this way, the network join request for multicast group 140 can be flooded in fabric 110, which allows a respective recipient network device to generate a multicast state for multicast group 140 and maintain it in the control plane. However, only network device 112 can program the forwarding entry in forwarding hardware 152, which allows network device 112 to forward multicast traffic from source 122. Furthermore, even if another network device 118 receives the multicast traffic, network device 118 may not forward the multicast traffic since there is no forwarding entry in its forwarding hardware.

Figure 1B:
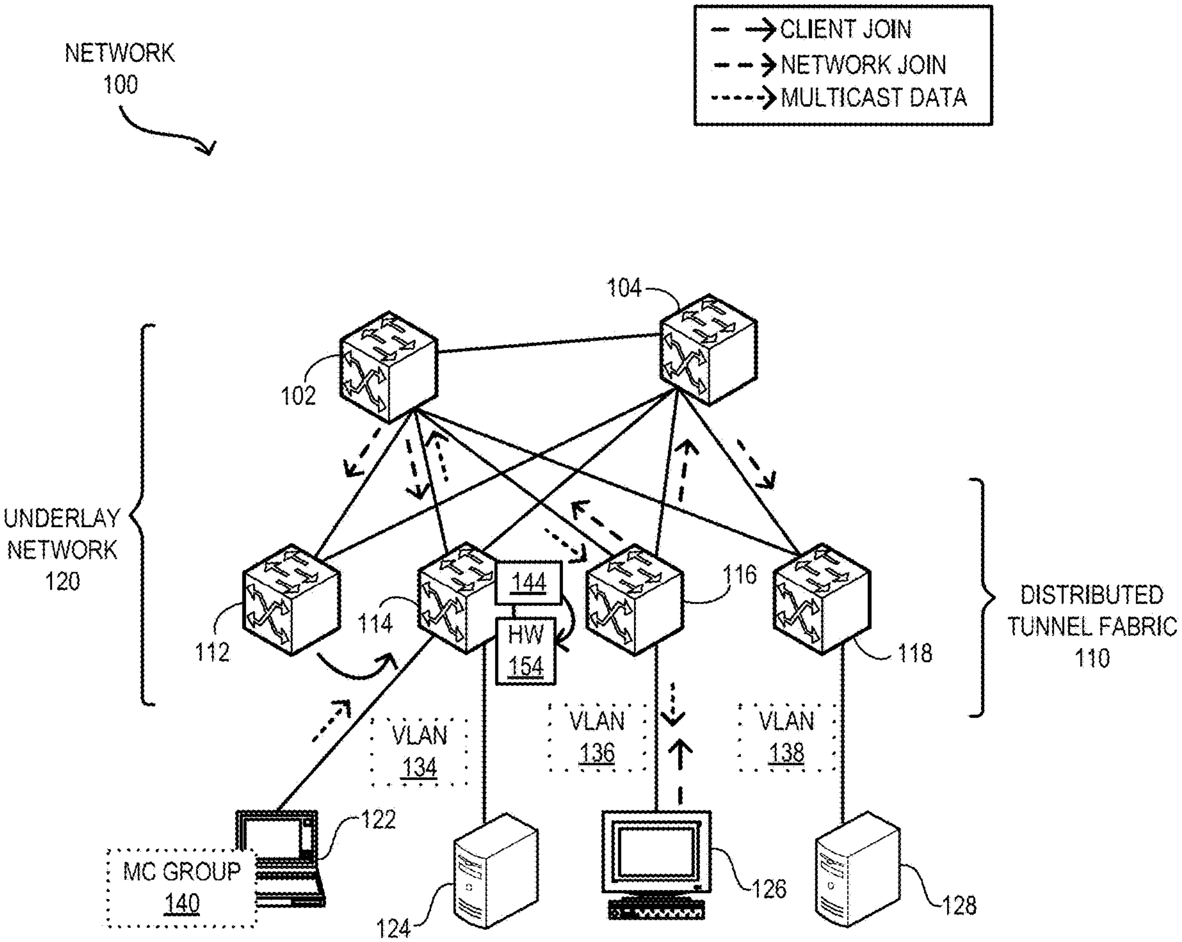
FIG. 1B illustrates an example of efficient multicast traffic forwarding upon source roaming in an overlay network, in accordance with an aspect of the present application.

FIG. 1B illustrates an example of efficient multicast traffic forwarding upon source roaming in an overlay network, in accordance with an aspect of the present application. During operation, source 122 can roam from network device 112 to network device 114 and couple network device 114 (denoted with a solid arrow in FIG. 1B). Therefore, network device 114 can become the new source network device for multicast group 140. For example, if source 122 is a wireless device, source 122 can roam from an AP coupling network device 112 to another AP coupling network device 114. Similarly, if source 122 is a VM, source 122 can migrate from a server coupling network device 112 to another server coupling network device 114. Network device 114 can then detect source 122 via a local port of network device 114. For example, when source 122 sends a packet, network device 114 can learn the MAC address of source 122 from the local port and detect the presence of source 122.

Upon roaming to network device 114, source 122 can start sending the multicast traffic to network device 114. When the first multicast packet is received via the local port from source 122, network device 114 can determine the multicast group from the packet and look up the multicast group in data structure 144. The lookup operation can match the entry for the multicast group in data structure 144. Network device 114 can obtain the multicast state associated with multicast group 140 from data structure 144. Network device 114 can then program a forwarding entry in forwarding hardware 154 of network device 114 based on the multicast state. This forwarding entry can indicate that the traffic received from source 122 through the local port is to be forwarded to the tunnel between network devices 114 and 116. In some examples, the multicast daemon (e.g., a PIM daemon) of network device 114 can program the forwarding entry in forwarding hardware 154.

Since the forwarding entry is programmed in forwarding hardware 154 based on the multicast state from data structure 144, network device 114 may program the forwarding entry without waiting for a network join request to arrive from network device 116. Based on the forwarding entry in forwarding hardware 154, network device 114 can forward the multicast traffic from source 122 to network device 116. In this way, network device 114 can readily program forwarding hardware 154 and start forwarding the multicast traffic of multicast group 140 to a respective requesting network device. Because network device 114 can efficiently forward network traffic from a roaming source, the transition period due to the roaming can be reduced, which can reduce the loss of traffic.

It should be noted that, upon learning the MAC address of source 122, network device 114 can send a control packet (e.g., an EVPN route update) to a respective other network device of fabric 110 comprising the MAC address. When network device 116 receives the control packet, network device 116 can determine that the MAC address of source 122 has become associated with network device 114. Accordingly, network device 116 can send a network join request to network device 114. Upon receiving the network join request, network device 114 can refresh the entry in data structure 144 as well as the forwarding entry hardware 154. Refreshing an entry can include resetting the timer, which can indicate the validity period of the entry. Therefore, network device 114 can efficiently program forwarding hardware 154 based on the multicast state in data structure 144 without modifying the process of sending network join requests.

Figure 2:
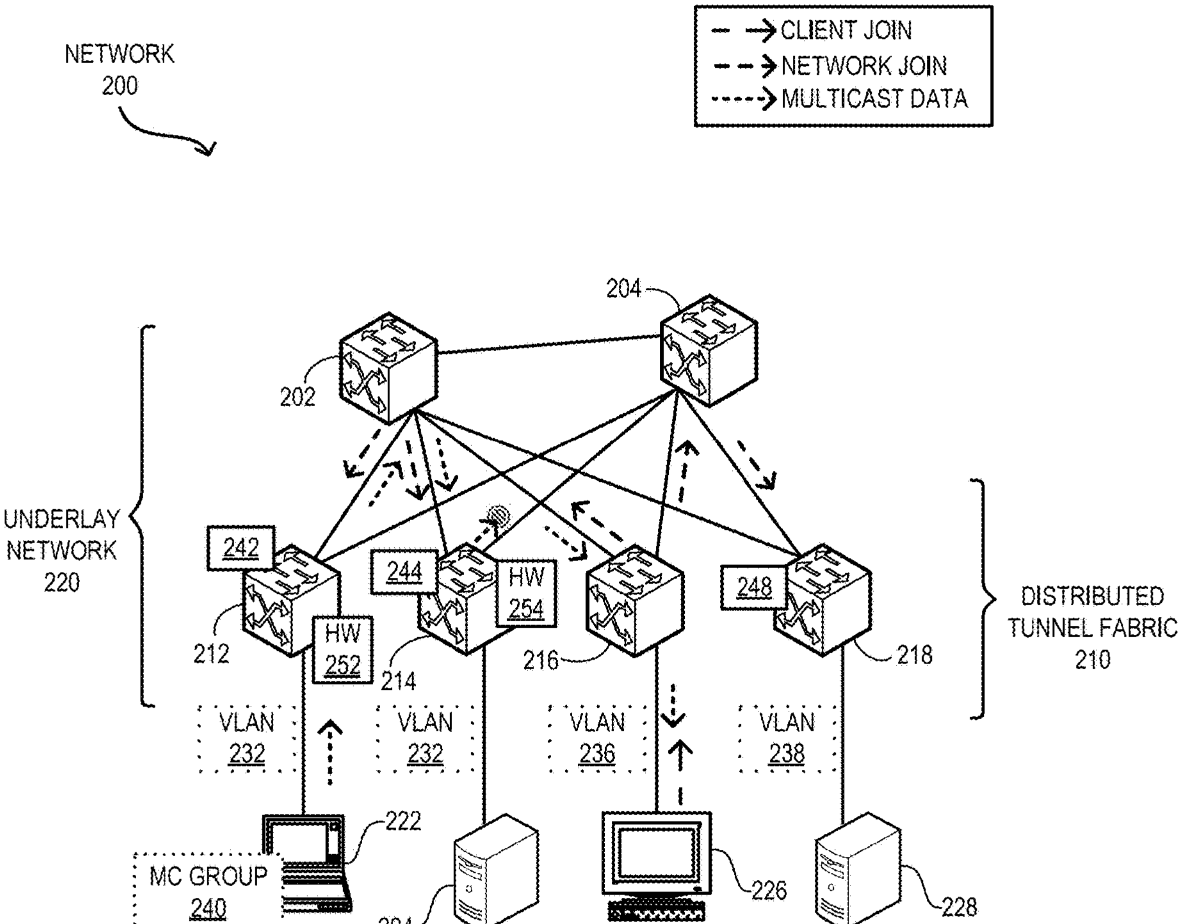
FIG. 2 illustrates an example of an overlay network with layer-2 extension supporting efficient multicast source roaming, in accordance with an aspect of the present application.

FIG. 2 illustrates an example of an overlay network with layer-2 extension supporting efficient multicast source roaming, in accordance with an aspect of the present application. A network 200 can include a number of network devices (e.g., switches), and may include heterogeneous network components, such as layer-2 and layer-3 hops, and tunnels. In some examples, network 200 can be an Ethernet network, InfiniBand network, or other network, and may use a corresponding communication protocol, such as IP, FCOE, or other protocol. Network 200 can include a number of network devices 202, 204, 212, 214, 216, and 218. A respective network device in network 200 can be associated with a MAC address and an IP address and can include one or more processing resources.

Network devices 212, 214, 216, and 218 can operate as tunnel endpoints in an overlay network 210, such as a distributed tunnel fabric 210, where the network devices can be coupled to each other via tunnels. Therefore, network devices 212, 214, 216, and 218 can be in fabric 210. For these network devices, tunnel encapsulation is initiated and terminated within fabric 210. Network devices in fabric 210 may form a mesh of tunnels. Examples of a tunnel can include, but are not limited to, VXLAN, GRE, NVGRE, Geneve, IPsec, and MPLS. A VPN, such as an EVPN, can be deployed over fabric 210. The tunnels in fabric 210 can be formed over an underlay network 220. Underlay network 220 can be a physical network, and a respective link of the underlying network can be a physical link.

A respective network device in fabric 210 can also be in underlay network 220. Furthermore, a network device operating as a tunnel endpoint can be in fabric 210. A respective pair of network devices in underlay network 220 can be a BGP peer. Therefore, in underlay network 220, a respective network device can use BGP to establish routes via which packets are forwarded. Accordingly, the encapsulated packets of fabric 210 can be forwarded via these routes in underlay network 220. End devices (or user devices) 222, 224, 226, and 228 can be coupled to network devices 212, 214, 216, and 218, respectively. In this example, VLANs 236 and 238 can be configured on network devices 216 and 218, respectively. In addition, VLAN 232 can be configured on both network devices 212 and 214. Therefore, the broadcast domain associated with VLAN 232 can be extended across network devices 212 and 214. As a result, a respective packet sent by end device 222 can be forwarded to end device 224 via network devices 212 and 214 (e.g., using a layer-2 TNI).

Here, end device 222 can be a source of a multicast group 240. Here, the multicast traffic of multicast group 240 can be transmitted from source 222 via network device 212. During operation, end device 226 can send a client join request (e.g., an IGMP or MLD join request) to network device 216. Network device 216 can then send a network join request (e.g., a PIM join request) to network device 212. In addition, network device 216 can also send the join request to network devices 214 and 218 via corresponding tunnels. Network devices 212, 214, and 218 can receive the network join request and maintain a corresponding multicast state in data structures 242, 244, and 248, respectively. These data structures can be maintained by the control plane (i.e., in respective memories of network devices 212, 214, and 218). The multicast state can indicate that network device 216 has requested traffic associated with multicast group 240 via the corresponding tunnel.

When network device 212 determines that source 222 is coupled via a local port of network device 212, network device 212 can determine that the condition for programming forwarding hardware 252 of network device 212 is satisfied. Accordingly, network device 212 can program forwarding hardware 252 with a forwarding entry (e.g., in the TCAM) based on the multicast state in data structure 242. On the other hand, network devices 214 and 218 can determine that the condition for programming the forwarding hardware is not satisfied. Therefore, though network devices 214 and 218 have received network join requests, network devices 214 and 218 can refrain from programming their respective forwarding hardware. Here, refraining from programming the forwarding hardware after receiving a network join request can be an atypical operation of a network device because the network device typically can program a forwarding entry in the forwarding hardware upon receiving a network join request. For example, the respective multicast demon instances of network devices 212, 214, and 216 can perform an additional check on the condition for programming the forwarding hardware. Because the condition is not satisfied at network devices 214 and 216, the multicast daemon instances on these network devices can refrain from programming their respective forwarding hardware.

Even when the same VLAN 232, which is associated with source 222, is configured on both network devices 212 and 214, only network device 212 can program forwarding hardware 252 because source 222 is locally coupled to a port of network device 212. On the other hand, network device 214 can refrain from programming forwarding hardware 254 of network device 214 because source 222 is not locally coupled to a port of network device 214. When network device 212 receives the multicast traffic of multicast group 240 from source 222, network device 212 can then forward the multicast traffic via the tunnel to network device 216. Since the broadcast domain of VLAN 232 is extended to network device 214, network device 212 can also forward the multicast traffic via the tunnel to network device 214. Forwarding hardware 254 is not programmed with a forwarding entry for multicast group 240. Accordingly, network device 214 can refrain from forwarding the received multicast traffic and may discard it.

If source 222 roams to network device 214, network device 212 would not receive any traffic from the local port that has been coupling source 222. Accordingly, the forwarding entry for multicast group 240 in forwarding hardware 252 can be timed out and removed. Typically, a respective forwarding entry is associated with a timer. If the forwarding entry does not incur any activity, such as a match for a packet or a refresh, during the timer period, the entry can be timed out. However, if the forwarding entry incurs an activity, the timer can restart. In some examples, upon receiving the control packet comprising the MAC address of source 222 from network device 214, network device 212 can determine that source 222 has moved aware from network device 212 and remove the forwarding entry from forwarding hardware 252. Upon roaming to network device 212, source 222 can start sending the multicast traffic to network device 214. Network device 114 can then obtain the multicast state associated with multicast group 240 from the corresponding entry in data structure 244 and program a forwarding entry in forwarding hardware 254 based on the multicast state. Here, network device 214 may program the entry without waiting for a network join request to arrive from network device 216.

Based on the entry in forwarding hardware 254, network device 214 can forward the multicast traffic from source 222 to network device 216. Since the broadcast domain of VLAN 232 is extended to network device 212, network device 214 can also forward the multicast traffic via the tunnel to network device 212. When the forwarding entry for multicast group 240 times out in forwarding hardware 252, the forwarding entry is removed. Consequently, forwarding hardware 252 is no longer programmed with a forwarding entry for multicast group 240. Accordingly, network device 212 can refrain from forwarding the received multicast traffic and may discard it. In this way, even when VLAN 232 is extended across multiple network devices, network device 214 can readily program forwarding hardware 254 and start forwarding the multicast traffic of multicast group 240.

Figure 3:
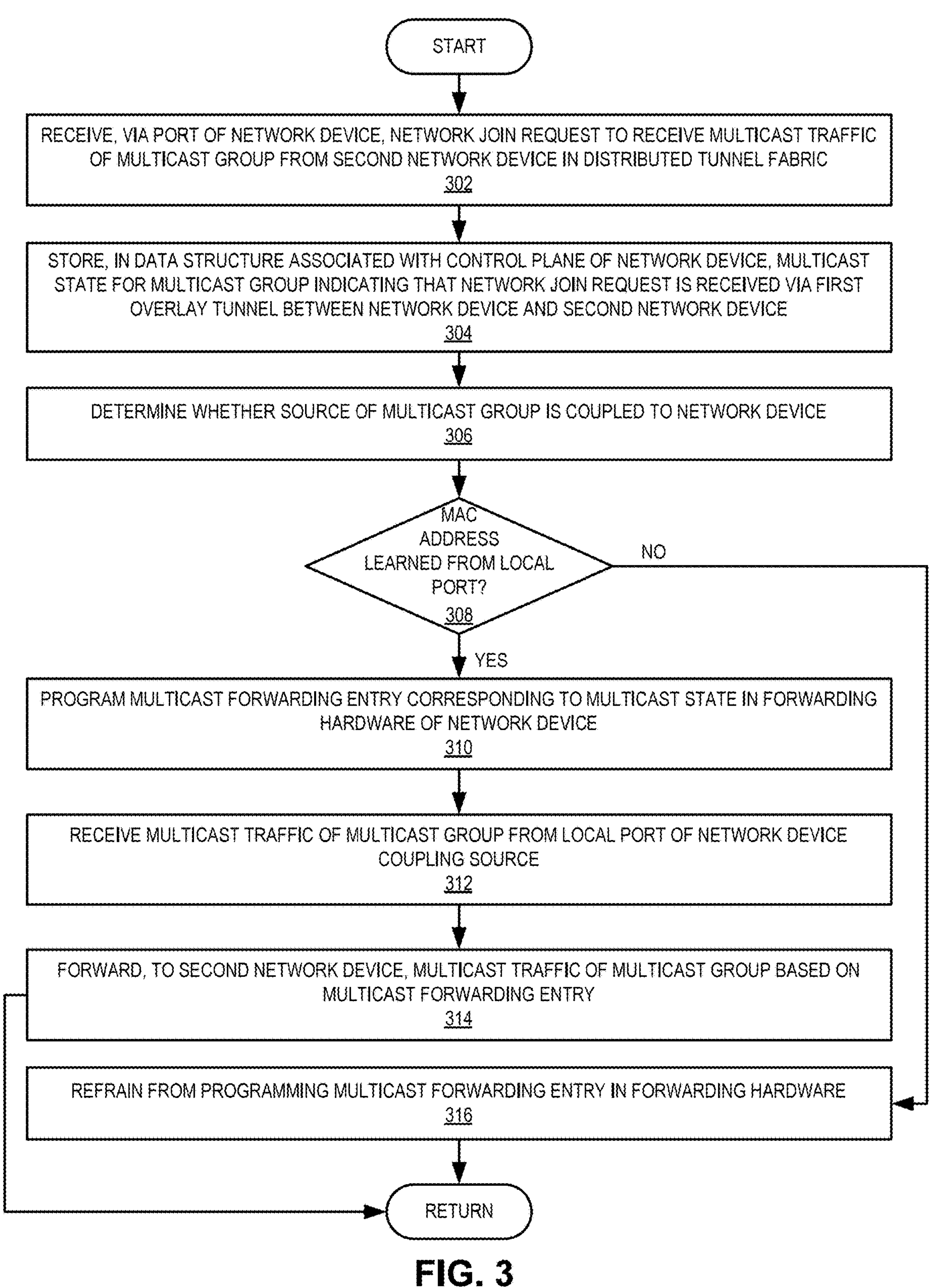
FIG. 3 presents a flowchart illustrating an example of a process of a network device maintaining multicast states to facilitate efficient multicast source roaming, in accordance with an aspect of the present application.

FIG. 3 presents a flowchart illustrating an example of a process of a network device maintaining multicast states to facilitate efficient multicast source roaming, in accordance with an aspect of the present application. During operation, the network device can receive, via a port of the network device, a network join request (e.g., a PIM join request) to receive the multicast traffic of a multicast group from a second network device in a distributed tunnel fabric (operation 302). Since the network device and the second network device are in the fabric, these network devices are coupled to each other via a first overlay tunnel. Therefore, the join request can be received via the first overlay tunnel. The network device can then store, in a data structure associated with the control plane of the network device, the multicast state for the multicast group (operation 304). Here, the multicast state can indicate that the network join request is received via the first overlay tunnel between the network device and the second network device. Here, the first and second network devices can correspond to network devices 112 and 114, respectively, of FIG. 1A, and the data structure can correspond to data structure 142.

The network device can determine whether the source of the multicast group (e.g., source 122 in FIG. 1A) is coupled to the network device (e.g., via a local port) (operation 306). The coupling of the source can indicate whether the condition for programming the forwarding hardware of the network device is satisfied. The network device can determine whether a local port couples the source by determining whether the MAC address of the source is learned from the local port (operation 308). If the MAC address is not learned from a local port, the source is not coupled to the network device (e.g., network device 114 or 118 in FIG. 1A). Here, the network device may have learned the MAC address from another network device (e.g., based on an EVPN route update). The network device can then refrain from programming the multicast forwarding entry in the forwarding hardware (operation 316). Since a network device typically programs a forwarding entry in the forwarding hardware based on a received network join request, refraining from programming such a forwarding entry can be an atypical and active operation of the network device. For example, the multicast demon instance of the network device can perform an additional check on the condition for programming the forwarding hardware. If the condition is not satisfied at the network device, the multicast daemon instance can refrain from programming the entry in the forwarding hardware.

On the other hand, if the MAC address is learned from a local port, the source is coupled to the network device. The network device can then program a multicast forwarding entry corresponding to the multicast state in the forwarding hardware of the network device (e.g., forwarding hardware 152 in FIG. 1A) (operation 310). The multicast forwarding entry can indicate that the traffic received from the local port should be forwarded to the first overlay tunnel. The multicast forwarding entry can be a TCAM entry in the ASIC of the network device. Subsequently, the network device can receive multicast traffic of the multicast group from the local port of the network device coupling the source (operation 312). The received traffic can then match the multicast forwarding entry in the forwarding hardware of the network device. Accordingly, the network device can forward, to the second network device, the multicast traffic of the multicast group based on the multicast forwarding entry (operation 314). In this way, the network device can efficiently program a multicast forwarding entry in the forwarding hardware. In the example in FIG. 1A, network device 112 can receive multicast traffic from source 122 and forward the multicast traffic to network device 116 based on the entry in forwarding hardware 152.

Figure 4A:
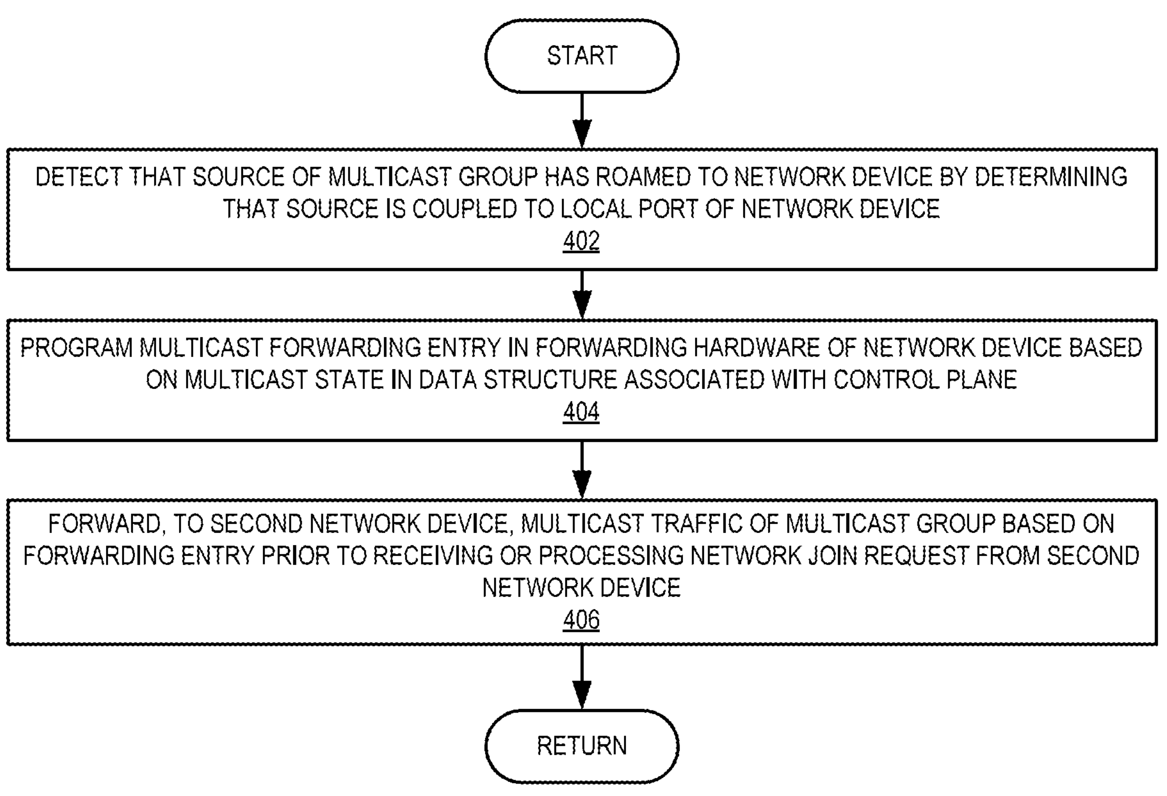
FIG. 4A presents a flowchart illustrating an example of a process of a network device detecting a multicast source roaming and programming corresponding multicast states, in accordance with an aspect of the present application.

FIG. 4A presents a flowchart illustrating an example of a process of a network device detecting a multicast source roaming and programming corresponding multicast states, in accordance with an aspect of the present application. During operation, the network device can determine that the source of a multicast group has roamed to the network device by determining that the source is coupled to a local port of the network device (operation 402). In the example in FIG. 1B, network device 114 can detect that source 122 has roamed to network device 114. The network device may detect the source by learning the MAC address of the source via the local port. The source may have previously been coupled to another network device. Therefore, the network device can maintain a multicast state associated with the multicast group in a data structure associated with the control plane without programming a corresponding forwarding entry in the forwarding hardware.

Upon determining that the source is coupled via the local port, the network device can program a multicast forwarding entry in the forwarding hardware (e.g., forwarding hardware 154 in FIG. 1B) of the network device based on the multicast state in the data structure (e.g., data structure 144 in FIG. 1B) associated with the control plane (operation 404). Here, the multicast state can indicate that the network join request is received via a second overlay tunnel between the network device and the second network device. Therefore, the multicast forwarding entry can indicate that the multicast traffic received via a port of the network device should be forwarded to the second overlay tunnel. Subsequently, the network device can receive multicast traffic of the multicast group from the local port of the network device coupling the source. The received traffic can then match the multicast forwarding entry. Accordingly, the network device can forward, to the second network device, the multicast traffic of the multicast group based on the multicast forwarding entry (operation 406). The network device can start forwarding the multicast traffic prior to receiving or processing a network join request from the second network device.

Figure 4B:
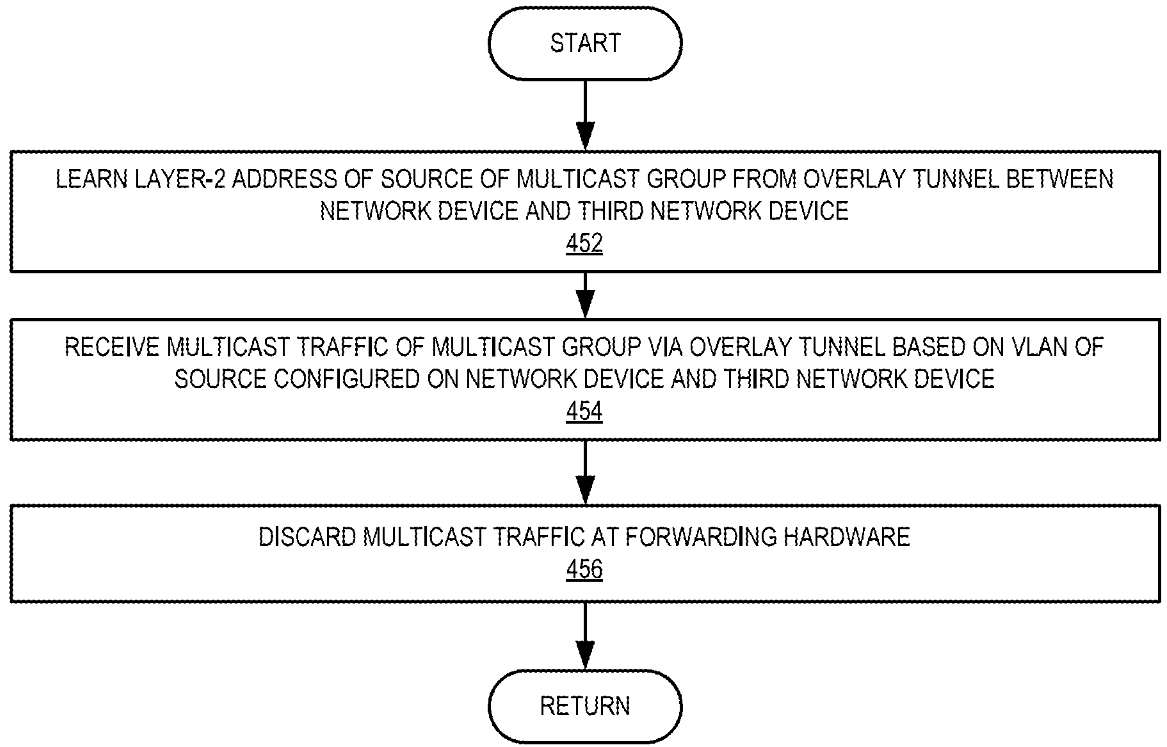
FIG. 4B presents a flowchart illustrating an example of a process of a network device processing multicast traffic received based on a layer-2 extension, in accordance with an aspect of the present application.

FIG. 4B presents a flowchart illustrating an example of a process of a network device processing multicast traffic received based on a layer-2 extension, in accordance with an aspect of the present application. During operation, the network device can learn a layer-2 address (e.g., a MAC address) of the source of a multicast group from an overlay tunnel between the network device and a third network device (operation 452). Here, the third network device can learn the layer-2 address of the source from its local port and can send a control packet comprising the layer-2 address of the source to the network device. The control packet can be sent via the overlay tunnel between the network device and a third network device. Upon receiving the control packet, the network device can learn the layer-2 address from the overlay tunnel. Here, the third network device can correspond to network device 214 in FIG. 2. Network device 214 can learn the layer-2 address of source 222 from a tunnel with network device 212.

Because of the layer-2 extension, the VLAN of the source (e.g., VLAN 232 in FIG. 2) can be extended between the network device and the third network device. As a result, a respective packet associated with the VLAN is distributed to the network device and the third network device. Accordingly, the network device can receive multicast traffic of the multicast group via the overlay tunnel based on the VLAN of the source configured on the network device and the third network device (operation 454). Since the network device has learned the layer-2 address of the source from the overlay tunnel and not from a local port, the source is not coupled to the network device. Therefore, the forwarding hardware of the network device is not programmed with a corresponding forwarding entry. Accordingly, the network device can discard the multicast traffic at the forwarding hardware (e.g., forwarding hardware 254 in FIG. 2) because the multicast traffic does not have a forwarding entry operation 456).

Figure 5:
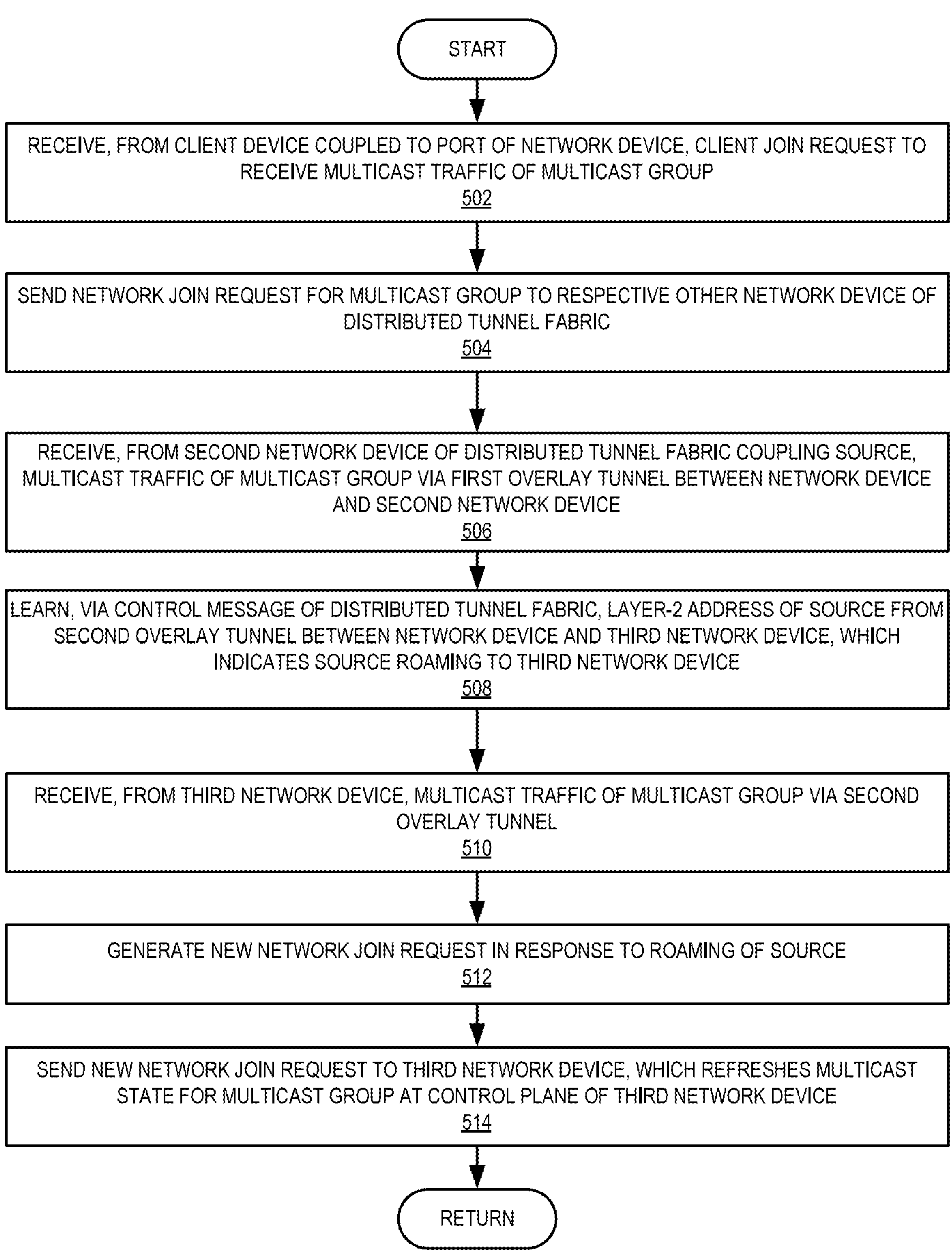
FIG. 5 presents a flowchart illustrating an example of a process of a network device receiving multicast traffic from a roaming source, in accordance with an aspect of the present application.

FIG. 5 presents a flowchart illustrating an example of a process of a network device receiving multicast traffic from a roaming source, in accordance with an aspect of the present application. During operation, the network device can receive, from a client device coupled to a port of the network device, a client join request (e.g., an IGMP or MLD join request) to receive multicast traffic of a multicast group (operation 502). Here, the network device can correspond to network device 116 in FIG. 1B. Network device 116 can receive a client join request for multicast group 140 from client device 126. The network device can then determine that it should obtain the multicast traffic from the source of the multicast group. Therefore, the network device can send a network join request (e.g., a PIM join request) for the multicast group to a respective other network device (e.g., to network devices 112, 114, and 118 of FIG. 1A) of the distributed tunnel fabric (operation 504). In this way, the other network devices can be aware of the request for traffic from the network device.

Based on the network join request, the network device can receive, from a second network device of the distributed tunnel fabric coupling the source, the multicast traffic of the multicast group via a first overlay tunnel between the network device and the second network device (e.g., network device 112 in FIG. 1B) (operation 506). Because the source is coupled to the second network device, it can program its forwarding hardware with a forwarding entry. The second network device can then forward the multicast traffic via the first overlay tunnel. Subsequently, the network device can learn, via a control message of the distributed tunnel fabric, a layer-2 address of the source from a second overlay tunnel between the network device and a third network device (e.g., network device 114 in FIG. 1B), which can indicate the source roaming to the third network device (operation 508). When the source roams to the third network device, it can learn the layer-2 address and share the learned address with the network device using the control message.

Since the source has roamed to the third network device, it can start receiving the multicast traffic from the source and start forwarding it to the requesting clients. Accordingly, the network device can receive, from the third network device, the multicast traffic of the multicast group via the second overlay tunnel (operation 510). The network device can also generate a new network join request in response to the roaming of the source (operation 512). For example, when the network device receives the control message, the network device can determine that the source has roamed to the third network device. Accordingly, the network device can send the new network join request to the third network device, which can refresh the multicast state for the multicast group at the control plane of the third network device (operation 514). In the example in FIG. 1B, network device 116 can determine that source 122 has roamed to network device 114. Hence, network device 116 can send a network join request to network device 114.

Figure 6:
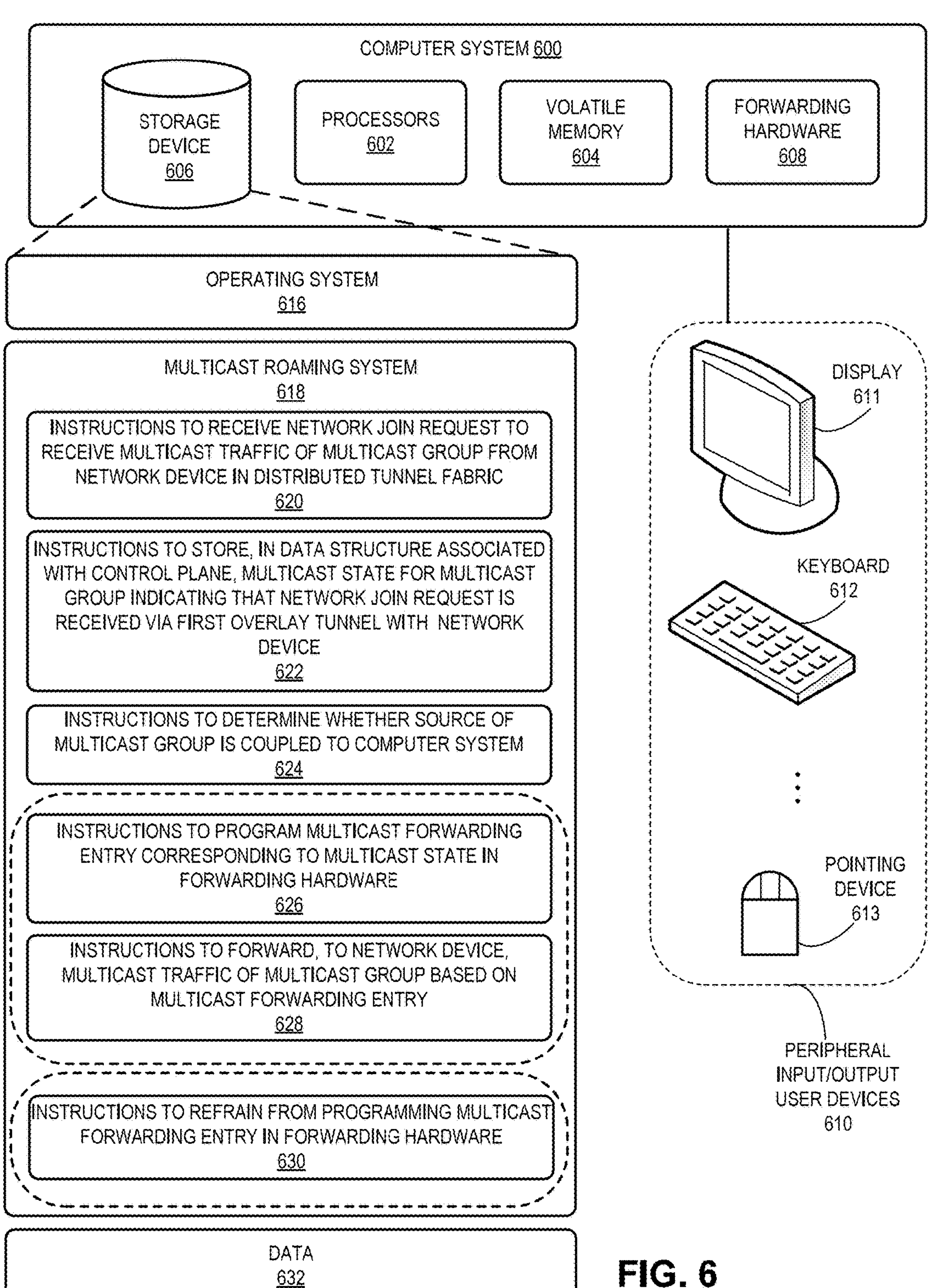
FIG. 6 illustrates an example of a computing system facilitating efficient multicast source roaming, in accordance with an aspect of the present application.

FIG. 6 illustrates an example of a computing system facilitating efficient multicast source roaming, in accordance with an aspect of the present application. Computer system 600 includes one or more processors 602, a memory 604, and a storage device 606. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Storage device 606 includes a non-transitory computer-readable storage medium and stores an operating system 616, a multicast roaming system 618, and data 628. Computer system 600 may include fewer or more entities or instructions than those shown in FIG. 6.

Multicast roaming system 618 can include instructions, which when executed by computer system 600, can cause computer system 600 to perform methods and/or processes described in this disclosure. Specifically, multicast roaming system 618 may include instructions 620 to identify a network join request to receive the multicast traffic of a multicast group from a network device in a distributed tunnel fabric. Here, computer system 600 can be in the fabric and couple the source of the multicast group. Therefore, the network device can send the network join request to computer system 600 upon receiving a client join request from a client device. Examples of receiving a network join request are further described in conjunction with FIGS. 1A and 2.

Multicast roaming system 618 may also include instructions 622 to store, in a data structure associated with the control plane, a multicast state for the multicast group. The multicast state can indicate that the network join request is received via a first overlay tunnel with the network device. Data structure 142 of FIG. 1A can be an example of the data structure associated with the control plane. Furthermore, multicast roaming system 618 may also include instructions 624 to determine whether the source of the multicast group is coupled to computer system 600. For example, network device 112 of FIG. 1A can determine whether source 122 is coupled to network device 112.

If the source is coupled to computer system 600, multicast roaming system 618 may include instructions 626 to program a multicast forwarding entry corresponding to the multicast state in forwarding hardware 608 (e.g., the ASIC) of computer system 600. Examples of forwarding hardware 608 can include forwarding hardware 152 of FIG. 1A and forwarding hardware 252 of FIG. 2. If the source is coupled to computer system 600, multicast roaming system 618 may include instructions 628 to forward, to the network device, the multicast traffic of the multicast group based on the multicast forwarding entry. Forwarding multicast traffic based on the multicast forwarding entry is further described in FIG. 1A.

On the other hand, if the source is not coupled to computer system 600, multicast roaming system 618 may include instructions 630 to refrain from programming the multicast forwarding entry in forwarding hardware 608, as described in conjunction with FIGS. 1A and 2. Data 632 can include any data that is required as input, or that is generated as output by the methods, operations, communications, and/or processes described in this disclosure. Specifically, data 632 can include multicast states associated with a respective multicast group, VLAN configurations, and layer-2 address information, such as the port or tunnel from which the layer-2 address has been learned.

Computer system 600 and multicast roaming system 618 may include more instructions than those shown in FIG. 6. For example, multicast roaming system 618 can also store instructions for receiving multicast traffic from source 122 of FIG. 1A; detecting a roaming source and programming the corresponding multicast forwarding entry in forwarding hardware 608 based on an entry in the data structure of FIG. 1B; forwarding multicast traffic of the multicast group before receiving or processing a new network join request of FIG. 1B; receiving multicast traffic based on layer-2 extension of FIG. 2 and discarding it; and the operations depicted in the flowcharts of FIGS. 3, 4A-4B, and 5; and the instructions of non-transitory CRM 700 in FIG. 7.

FIG. 7 illustrates an example of a CRM facilitating receiving multicast traffic from a roaming source, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to receive, from a client device coupled to a port of a first network device in a distributed tunnel fabric, a client join request to receive the multicast traffic of a multicast group, as described above in relation to the join request and the multicast data of FIG. 1A.

CRM 700 can also include instructions 712 to send a network join request for the multicast group to a respective other network device of the distributed tunnel fabric, as described above in relation to FIG. 1A. CRM 700 can include instructions 714 to receive, from a second network device coupling the source of the multicast group, multicast traffic of the multicast group via a first overlay tunnel between the first network device and the second network device, as described above in relation to FIG. 1A.

CRM 700 can additionally include instructions 716 to, in response to the source roaming to a third network device of the distributed tunnel fabric, receive, from the third network device, multicast traffic of the multicast group via a second overlay tunnel between the first network device and the third network device, as described above in relation to FIG. 1B.

CRM 700 may include more instructions than those shown in FIG. 7. For example, CRM 700 can also store instructions for executing the operations described above in relation to: receiving multicast traffic from source 122 of FIG. 1A; detecting a roaming source and programming the corresponding multicast forwarding entry in forwarding hardware 608 based on an entry in the data structure of FIG. 1B; forwarding multicast traffic of the multicast group before receiving or processing a new network join request of FIG. 1B; receiving multicast traffic based on layer-2 extension of FIG. 2 and discarding it; and the operations depicted in the flowcharts of FIGS. 3, 4A-4B, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a first network device in a distributed tunnel fabric. During operation, the first network device can receive, via a port of the first network device, a network join request to receive multicast traffic of a multicast group from a second network device in the distributed tunnel fabric. Here, a respective network device pair of the distributed tunnel fabric can be coupled to each other via an overlay tunnel. The first network device can store a multicast state for the multicast group in a data structure associated with a control plane of the first network device. The multicast state can indicate that the network join request is received via a first overlay tunnel between the first network device and the second network device. The first network device can then determine whether a source of the multicast group is coupled to the first network device. If the source is coupled to the first network device, the first network device can program a multicast forwarding entry corresponding to the multicast state in the forwarding hardware of the first network device. The first network device can then forward, to the second network device, the multicast traffic of the multicast group based on the multicast forwarding entry.

In a variation on this aspect, the first network device can receive the multicast traffic of the multicast group from a first port of the first network device coupling the source.

In a variation on this aspect, if the source is not coupled to the first network device, the first network device can refrain from programming the multicast forwarding entry in the forwarding hardware.

In a further variation, the first network device can detect that the source is coupled to a second port of the first network device and program a multicast forwarding entry in the forwarding hardware of the first network device based on the multicast state. The first network device can then forward, to the second network device, the multicast traffic of the multicast group based on the multicast forwarding entry.

In a further variation, forwarding the multicast traffic of the multicast group to the second network device can include one or more of: forwarding the multicast traffic prior to receiving a new network join request from the second network device, and forwarding the multicast traffic prior to processing the new network join request, wherein the new network join request refreshes the multicast forwarding entry.

In a further variation, the source can be coupled to a third network device of the distributed tunnel fabric. Here, a VLAN of the source can be configured on the first network device and the third network device. The first network device can then receive the multicast traffic of the multicast group via a second overlay tunnel between the first network device and the third network device. Subsequently, the first network device can discard the multicast traffic at the forwarding hardware.

In a variation on this aspect, the distributed tunnel fabric can be based on an Ethernet virtual private network (EVPN). The control information can then be exchanged in the distributed tunnel fabric via respective EVPN route updates.

In a variation on this aspect, the second network device can send the network join request in response to receiving an IGMP join request from a client device, and the network join request can include a PIM join request.

Another aspect of the present technology can provide a first network device in a distributed tunnel fabric. During operation, the first network device can receive, from a client device coupled to a local port, a client join request to receive multicast traffic of a multicast group. The first network device can then send a network join request for the multicast group to a respective other network device of the distributed tunnel fabric. Subsequently, the first network device can receive, from a second network device of the distributed tunnel fabric, the multicast traffic of the multicast group via a first overlay tunnel between the first network device and the second network device. Here, the source of the multicast group can be coupled to the second network device. If the source roams to a third network device of the distributed tunnel fabric, the first network device can receive, from the third network device, the multicast traffic of the multicast group via a second overlay tunnel between the first network device and the third network device.

In a variation on this aspect, the receiving the multicast traffic from the third network device comprises one or more of: receiving the multicast traffic prior to sending a new network join request for the multicast group to the third network device, receiving the multicast traffic prior to the third network device receiving the new network join request, and receiving the multicast traffic prior to the third network device processing the new network join request.

In a further variation, the first network device can determine the roaming of the source via a control message of the distributed tunnel fabric. The first network device can then generate the new network join request in response to determining the roaming of the source.

In a further variation, the distributed tunnel fabric can be based on an Ethernet virtual private network (EVPN). The control message can then be an EVPN route update received from the third network device.

In a variation on this aspect, the client join request can include an IGMP join request. The network join request can include a PIM join request.

In a variation on this aspect, the network join request can trigger the generation of a multicast state for the multicast group at a control plane of a receiving network device. The multicast state can indicate the multicast group and a tunnel between the first network device and the receiving network device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a first network device in a distributed tunnel fabric, a network join request to receive multicast traffic of a multicast group from a second network device in the distributed tunnel fabric, wherein a respective pair of network devices of the distributed tunnel fabric are coupled to each other via a tunnel;

storing a multicast state for the multicast group in a data structure associated with a control plane of the first network device, wherein the multicast state indicates that the network join request is received via a first overlay tunnel between the first network device and the second network device;

determining, by the first network device, whether a media access control (MAC) address of a source of the multicast group is learned from a local port of the first network device; and in response to learning the MAC address from the local port of the first network device:

programming a multicast forwarding entry in forwarding hardware of the first network device based on the multicast state stored in the data structure; and forwarding, to the second network device, the multicast traffic received from the local port based on the multicast forwarding entry.

2. The method of claim 1, further comprising receiving the multicast traffic of the multicast group from the local port of the first network device.

3. The method of claim 1, wherein, in response to not learning the MAC address from the local port, the method further comprises refraining from programming the multicast forwarding entry in the forwarding hardware.

4. The method of claim 3, further comprising:

determining that the source has roamed to the first network device in response to learning the MAC address from the local port; and programming the multicast forwarding entry in the forwarding hardware of the first network device based on the multicast state.

5. The method of claim 4, wherein forwarding the multicast traffic of the multicast group to the second network device comprises one or more of:

forwarding the multicast traffic prior to receiving a new network join request from the second network device; and forwarding the multicast traffic prior to processing the new network join request, wherein the new network join request refreshes the multicast forwarding entry.

6. The method of claim 3, wherein the source is coupled to a third network device of the distributed tunnel fabric, and wherein a virtual local area network (VLAN) of the source is configured on the first network device and the third network device;

wherein the method further comprises:

receiving, by the first network device, the multicast traffic of the multicast group via a second overlay tunnel between the first network device and the third network device; and discarding the multicast traffic at the forwarding hardware of the first network device.

7. The method of claim 1, wherein the distributed tunnel fabric is based on an Ethernet virtual private network (EVPN), and wherein control information is exchanged in the distributed tunnel fabric via respective EVPN route updates.

8. The method of claim 1, wherein the second network device sends the network join request in response to receiving an Internet Group Management Protocol (IGMP) join request from a client device, and wherein the network join request includes a Protocol-Independent Multicast (PIM) join request.

9. A method, comprising:

receiving, from a client device coupled to a port of a first network device in a distributed tunnel fabric comprising a plurality of network devices, a client join request to receive multicast traffic of a multicast group, wherein a respective pair of network devices of the distributed tunnel fabric are coupled to each other via a tunnel;

sending, by the first network device, a network join request for the multicast group to a respective other network device of the distributed tunnel fabric;

receiving, from a second network device of the distributed tunnel fabric, the multicast traffic of the multicast group via a first overlay tunnel between the first network device and the second network device, wherein a source of the multicast group is coupled to the second network device; and in response to the source roaming to a third network device of the distributed tunnel fabric, receiving, by the first network device from the third network device, the multicast traffic of the multicast group via a second overlay tunnel between the first network device and the third network device.

10. The method of claim 9, wherein the receiving the multicast traffic from the third network device comprises one or more of:

receiving, by the first network device, the multicast traffic prior to sending a new network join request for the multicast group from the first network device to the third network device;

receiving the multicast traffic prior to the third network device receiving the new network join request from the first network device; and receiving the multicast traffic prior to the third network device processing the new network join request from the first network device.

11. The method of claim 9, further comprising:

determining the roaming of the source in response to receiving a control message of the distributed tunnel fabric from the third network device, wherein the control message comprises a media access control (MAC) address of the source.

12. The method of claim 11, wherein the distributed tunnel fabric is based on an Ethernet virtual private network (EVPN), and wherein the control message is an EVPN route update received from the third network device.

13. The method of claim 9, wherein the client join request includes an Internet Group Management Protocol (IGMP) join request, and wherein the network join request includes a Protocol-Independent Multicast (PIM) join request.

14. The method of claim 9, wherein the network join request triggers generation of a multicast state for the multicast group at a control plane of a receiving network device, wherein the multicast state indicates the multicast group and a tunnel between the first network device and the receiving network device.

15. A non-transitory computer-readable storage medium storing instructions that when executed by at least one processing resource of a first network device in a distributed tunnel fabric cause the at least one processing resource to perform a method, the method comprising:

receiving, by a first network device in a distributed tunnel fabric, a network join request to receive multicast traffic of a multicast group from a second network device in the distributed tunnel fabric, wherein a respective pair of network devices of the distributed tunnel fabric are coupled to each other via a tunnel;

storing a multicast state for the multicast group in a data structure associated with a control plane of the first network device, wherein the multicast state indicates that the network join request is received via a first overlay tunnel between the first network device and the second network device;

determining, by the first network device, whether a media access control (MAC) address of a source of the multicast group is learned from a local port of the first network device; and in response to learning the MAC address from the local port of the first network device:

programming a multicast forwarding entry in forwarding hardware of the first network device based on the multicast state stored in the data structure; and forwarding, to the second network device, the multicast traffic received from the local port based on the multicast forwarding entry.

16. The non-transitory computer-readable storage medium of claim 15, wherein the method further comprises receiving the multicast traffic of the multicast group from the local port of the first network device.

17. The non-transitory computer-readable storage medium of claim 15, wherein, in response to not learning the MAC address from the local port, the method further comprises refraining from programming the multicast forwarding entry in the forwarding hardware.

18. The non-transitory computer-readable storage medium of claim 17, wherein the method further comprises:

determining that the source has roamed to the first network device in response to learning the MAC address from the local port; and programming the multicast forwarding entry in the forwarding hardware of the first network device based on the multicast state.

19. The non-transitory computer-readable storage medium of claim 18, wherein forwarding the multicast traffic of the multicast group to the second network device comprises one or more of:

forwarding the multicast traffic prior to receiving a new network join request from the second network device; and forwarding the multicast traffic prior to processing the new network join request, wherein the new network join request refreshes the multicast forwarding entry.

20. The non-transitory computer-readable storage medium of claim 17, wherein the source is coupled to a third network device of the distributed tunnel fabric, and wherein a virtual local area network (VLAN) of the source is configured on the first network device and the third network device;

wherein the method further comprises:

receiving, by the first network device, the multicast traffic of the multicast group via a second overlay tunnel between the first network device and the third network device; and discarding the multicast traffic at the forwarding hardware of the first network device.

* * * * *